UNITED STATES PATENT OFFICE.

PETER E. MINOR, OF SCHENECTADY, NEW YORK.

IMPROVED MATERIAL FOR THE MANUFACTURE OF GLASS.

Specification forming part of Letters Patent No. 72,878, dated December 31, 1867.

*To all whom it may concern:*

Be it known that I, PETER E. MINOR, of Schenectady, in the county of Schenectady and State of New York, have invented a new and useful Improvement in the Manufacture of Glass; and I do hereby declare that the following is a full, clear, and exact description of the process of manufacturing the same.

The nature of my invention consists in making glass of the dross or refuse which is thrown off in the smelting of iron ore.

I take the dross and manufacture the same into glass by melting the dross in the usual way of melting the materials in the manufacture of glass. I contemplate also that the dross may be manufactured into glassware while it is in a melted state, as it runs from the furnace in the smelting of the ore, and thus the expense of melting the dross may be avoided.

Having thus fully described my invention, what I claim therein as new, and desire to secure by Letters Patent, is—

The manufacture of glass of the dross or refuse which is thrown off in the smelting of iron ore, substantially as described.

P. E. MINOR.

Witnesses:
    W. BURRIS,
    GILBERT B. TOWLES.